UNITED STATES PATENT OFFICE.

ALLEN T. BALDWIN, OF LAKEWOOD, OHIO, ASSIGNOR TO NATIONAL CARBON COMPANY, OF CLEVELAND, OHIO, A CORPORATION OF NEW JERSEY.

ARC-LAMP ELECTRODE.

1,127,578.     Specification of Letters Patent.     Patented Feb. 9, 1915.

No Drawing.     Application filed May 22, 1913. Serial No. 769,285.

*To all whom it may concern:*

Be it known that I, ALLEN T. BALDWIN, a citizen of the United States, residing at Lakewood, in the county of Cuyahoga and State of Ohio, have invented a certain new and useful Improvement in Arc-Lamp Electrodes, of which the following is a full, clear, and exact description.

My invention relates to electrodes for producing flaming or luminous arcs.

In flaming or luminous lamps, the electrode contains a material for producing an arc flame of high candle power. With most flaming materials, it is desirable to include an additional material for supporting the arc and to act in conjunction therewith to increase the candle power.

My invention relates to a composition that raises the candle power and is an efficient arc supporter and also produces an arc flame of high candle power of a brilliant blue white light.

Since the composition of materials in accordance with my invention is a good arc supporter and increases the candle power, I have found it to be especially efficient in combination with such materials as calcium fluorid and rare earth fluorids. However, its flaming properties are such that it forms an excellent electrode without any other flaming material, carbon or other conducting material being used therewith.

If the oxids of cerium, zirconium, and tungsten are fused together at a high heat such as would be obtained in the electric furnace, a resulting mass is obtained that is entirely homogeneous as far as can be determined. I do not know for certain whether this as a chemical compound or not, but on cooling, some crystals are formed which probably are of a definite chemical compound. I am inclined to believe that the entire fused mass is not strictly a chemical compound though, of course, my invention does not depend upon this point. The fused mass when cooled breaks into sharp fragments having a brownish color. The oxids mentioned may be combined in various proportions, but I have found that an efficient arc material is obtained by fusing together three parts of cerium oxid, two parts zirconium oxid and one part tungstic oxid. The specific gravity of the product when produced from the proportions given is about 5.73. The density of a homogeneous mechanical mixture of oxids in such proportions is about 5.15. From this it will be noted that the density of the fused mass is about 9% greater than that of the mixture. It is obvious that the fused product has an advantage over the mechanical mixture of the pulverized oxids in that more material can be compacted in a given space.

The new product should be ground and mixed with carbon, or other conductive material in the ratio of 20% to 40% of the former to 80% to 60% of the latter. In cored carbons, I prefer to make about 60% of the core of the ground fused product, the remainder of the core consisting of some of the usual forms of carbon employed in making lamp electrodes and a suitable binder. If this material is to be used in conjunction with other flaming material, I prefer to mix them together in about equal parts, the whole mass of flaming and arc supporting material consisting of about 20% to 40% of the solid electrode or about 60% of the core in cored electrodes.

Having described my invention, what I claim is:

1. An arc lamp electrode containing a flaming and arc supporting material consisting of a homogeneous mixture of oxids of cerium, zirconium and tungsten.

2. An arc lamp electrode containing a flaming and an arc supporting material consisting of fused oxids of cerium, zirconium and tungsten.

3. An arc lamp electrode containing carbon and a material consisting of an intimate and homogeneous mixture of oxids of zirconium, tungsten and cerium.

4. An arc lamp electrode containing carbon and a material obtained by fusing together the oxids of zirconium, tungsten and cerium.

5. An arc lamp electrode containing a flaming and an arc supporting material consisting approximately of three parts cerium oxid, two parts zirconium oxid and one part tungstic oxid.

In testimony whereof, I hereunto affix my signature.

ALLEN T. BALDWIN.

Witnesses:
   IRA J. ADAMS,
   H. G. GROVER.